United States Patent Office.

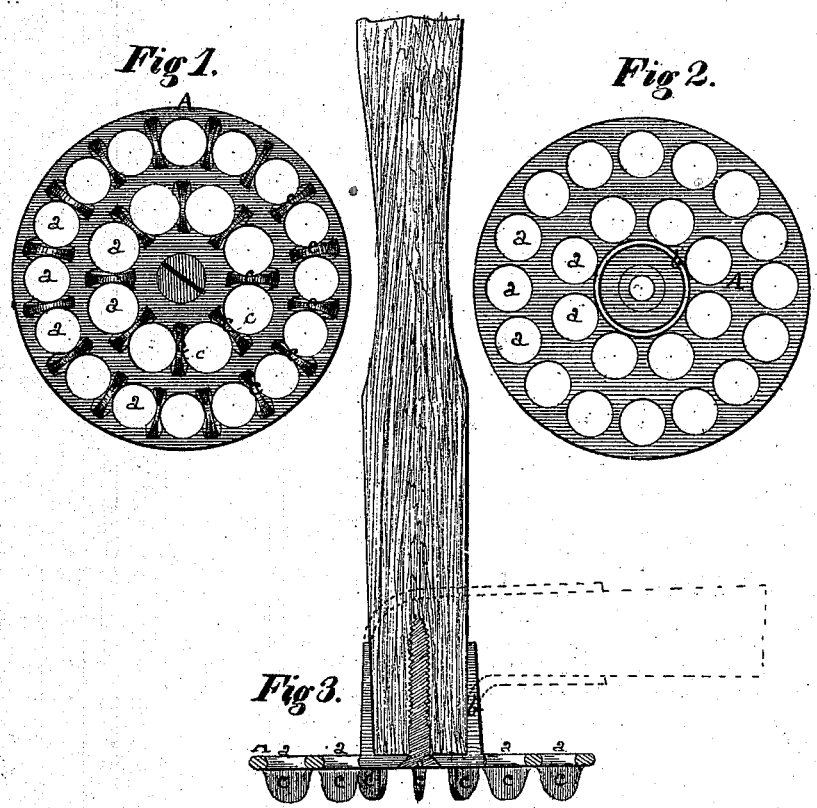

GEORGE A. ANDERSON AND CHARLES J. BAKER, OF ALBANY, NEW YORK.

Letters Patent No. 108,083, dated October 11, 1870.

IMPROVEMENT IN MEAT AND VEGETABLE MASHERS.

The Schedule referred to in these Letters Patent and making part of the same.

*To all whom it may concern:*

Be it known that I, GEORGE A. ANDERSON and CHARLES J. BAKER, of the city and county of Albany, State of New York, have invented a new and improved Domestic Utensil for Preparing Potatoes and Meat for Food; and we do hereby declare that the following is a description thereof, reference being had to the accompanying drawings forming a part of this specification, in which—

Figure 1 represents a view of the invention from its lower or face side, and illustrates the improvements.

Figure 2 represents a view of the upper side of the utensil.

Figure 3 is a cross-section of the utensil as improved, and embodying the several perforations and projecting teeth, and illustrating their arrangement on the face of the same, and also the mode of attaching the handles to the same.

The nature of our invention consists in the combination of several series of incising teeth, with perforations in a metal disk, or plate of metal, which is attached to a suitable handle, and the whole so arranged as to be capable of being operated by pressure or pounding in such a manner that the said teeth and perforations will operate to separate, mash, cut, or otherwise affect the particles of the meat or vegetables operated upon; the object of this invention being to afford a ready, simple, and cheap utensil, with which potatoes and other vegetables can be readily and easily mashed, and, by which meat can be cut or contused, and thereby made tender.

To enable others skilled in the art to make and use our invention, we will proceed to describe it in reference to the drawings and the letters of reference marked thereon, the same letters indicating like parts.

A, fig. 1, represents a piece of metal, (we would prefer cast malleable iron,) which may be square, circular, or of any other form.

Into the said metal piece is made any suitable number of perforations, *a a*, which may be circular or any other form.

Projecting from the lower side of the metal piece A are teeth or incisors, which incisors may be more or less sharp, as may be desired, and will be best adapted to the substance to be operated upon.

The perforations *a a* and incisors *c c* are placed alternate, or, in other words, two opposite sides of the said perforations depend down below the main body of the metal piece A to a suitable distance, as shown in figs. 1 and 3.

We prefer to have the said incisors *c* to have their width run in the direction of the radii of a circle, as shown in fig. 1, which would strengthen the rim, inclosing the outer series of perforations *a* with the rim inclosing the inner series of perforations *a*, and permit the metal of the disk A being made lighter.

Any suitable handle, B, may be provided, and may be secured by a socket, *b*, as in figs. 2 and 3, or in any other manner by which sufficient strength may be secured. The handle may be either upright, as in fig. 3, or on an angle shown in dotted lines.

In operating on potatoes, or other vegetables, the operator grasps the handle B, if upright, and presses it down on the said vegetables, when the incisors *c c* will enter the vegetables and split them at each point in contact, when the broken portions of the vegetables operated upon will rise up and pass through the openings *a a*. After the operation has been repeated a little time the vegetables will become thoroughly broken or mashed.

In operating upon meat the operator grasps the handle B, (we would prefer a handle running off at an angle, as in fig. 3,) and beats the said meat quite heavily, when the incisors *c* will enter and cut or contuse, while portions of the same will rise up into the openings *a a* by reason of the concussion. A few blows with this instrument will render the toughest meat tender.

Having described our invention,

What we claim, and desire to secure by Letters Patent, is—

A potato or meat-pounder or masher, constructed of the metal piece A, provided with the perforations *a a* and projections *c c*, placed alternate, and arranged substantially as and for the purpose set forth.

GEORGE A. ANDERSON.
CHARLES J. BAKER.

Witnesses:
ALEX. SELKIRK,
JAMES A. BUCKBEE, Jr.